US012661955B2

(12) United States Patent　　　　(10) Patent No.:　US 12,661,955 B2
Koberstein et al.　　　　　　　　　(45) Date of Patent:　　Jun. 23, 2026

(54) HVAC APPARATUS FOR A VEHICLE

(71) Applicant: Ford Global Technologies, LLC, Dearborn, MI (US)

(72) Inventors: Manfred Koberstein, Troy, MI (US); John Azar, LaSalle (CA); Rachael Eileen Shey, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 18/621,568

(22) Filed: Mar. 29, 2024

(65) Prior Publication Data

US 2025/0303824 A1　　Oct. 2, 2025

(51) Int. Cl.
　　B60H 1/32　　　　(2006.01)
　　B60H 1/00　　　　(2006.01)
(52) U.S. Cl.
　　CPC ........ B60H 1/3227 (2013.01); B60H 1/00807 (2013.01); B60H 1/3229 (2013.01); *B60H 2001/00092* (2013.01); *B60H 2001/00164* (2013.01)
(58) Field of Classification Search
　　CPC .......................... B60H 1/3227; B60H 1/00807; B60H 1/3229; B60H 2001/00092; B60H 2001/00164
　　See application file for complete search history.

(56) References Cited

U.S. PATENT DOCUMENTS

| | | | |
|---|---|---|---|
| 5,181,553 A | 1/1993 | Doi | |
| 10,106,011 B2 | 10/2018 | Goenka | |
| 10,245,921 B2 | 4/2019 | Mer et al. | |
| 10,661,635 B2* | 5/2020 | Maeda | B60H 1/3227 |
| 10,696,135 B2 | 6/2020 | Ceperkovic et al. | |
| 10,953,727 B2 | 3/2021 | Hötzel et al. | |
| 2003/0056531 A1* | 3/2003 | Nishida | B60H 1/00064 |
| | | | 62/244 |
| 2020/0282806 A1 | 9/2020 | Sharma | |
| 2021/0101439 A1 | 4/2021 | Hayes et al. | |
| 2024/0059125 A1* | 2/2024 | Miyakoshi | B60H 1/00921 |
| 2024/0116330 A1* | 4/2024 | Kim | B60H 1/00864 |

FOREIGN PATENT DOCUMENTS

KR　　　　102460880 B1　　11/2022

* cited by examiner

*Primary Examiner* — Marc E Norman
(74) *Attorney, Agent, or Firm* — Vichit Chea; Price Heneveld LLP

(57)　　　　　　ABSTRACT

A heating, ventilation, and air conditioning (HVAC) apparatus for a vehicle includes a housing defining an inlet, an outlet, an airflow path between the inlet and the outlet, a heat exchanger disposed along the airflow path for selectively heating and cooling air in the airflow path, a passage between the inlet and the outlet and dividing the airflow path into a first path through the heat exchanger and a second path through the passage bypassing the heat exchanger, and a bypass door selectively covering the passage to control airflow through the first and second paths.

9 Claims, 3 Drawing Sheets

HVAC APPARATUS FOR A VEHICLE

FIELD OF THE DISCLOSURE

The present disclosure generally relates to an HVAC apparatus for a vehicle, in particular, to an evaporator blower assembly for controlling the temperature of air provided in a vehicle.

BACKGROUND OF THE DISCLOSURE

Consumers often compare available features and functionality between vehicles when making a purchasing decision. Vehicle weight can reduce range and operating efficiency. Accordingly, additional solutions are needed that provide features and functionality that are desirable to consumers.

SUMMARY OF THE DISCLOSURE

According to a first aspect of the present disclosure, a heating, ventilation, and air conditioning (HVAC) apparatus for a vehicle includes a housing defining an inlet, an outlet, an airflow path between the inlet and the outlet, a heat exchanger disposed along the airflow path for selectively heating and cooling air in the airflow path, a passage between the inlet and the outlet and dividing the airflow path into a first path through the heat exchanger and a second path through the passage bypassing the heat exchanger, and a bypass door selectively covering the passage to control airflow through the first and second paths.

Embodiments of the first aspect of the present disclosure can include any one or a combination of the following features:

- the heat exchanger is the only heat exchanger of the HVAC apparatus, and wherein the heat exchanger contains thermal fluid having an operating temperature at least partially determined by user input;
- a restriction plate extending across the passage and configured to reduce airflow through the second path;
- the restriction plate includes a baffle;
- a first temperature sensor configured to sense a temperature of air in the outlet;
- a second temperature sensor proximate to the heat exchanger for monitoring a temperature of the heat exchanger;
- an actuator configured to move the bypass door in response to a control signal;
- a controller in communication with the temperature sensor and the actuator and configured to communicate the control signal in response to at least one of the temperature of the air in the outlet and the temperature of the heat exchanger;
- the controller is configured to receive a target temperature set by a user and control a degree of opening for the bypass door in response to the target temperature;
- the controller is configured to communicate a signal to the heat exchanger to adjust the operating temperature of the thermal fluid in response to the target temperature;
- a blower configured to draw air into the inlet, wherein the control circuitry is configured to control the blower and the bypass door in response to the target temperature;
- the housing defines a second outlet, and further comprising a second passage between the inlet and the second outlet and dividing the airflow path into a third path through the second passage bypassing the heat exchanger, and a second bypass door selectively covering the second passage to control airflow through the third path; and

- a divider downstream of the heat exchanger and dividing the first path into a plurality of outlet paths each extending to a corresponding plurality of outlets.

According to a second aspect of the present disclosure, a heating, ventilation, and air conditioning (HVAC) apparatus for a vehicle includes a housing defining an inlet, an outlet, an airflow path between the inlet and the outlet, and a heat exchanger disposed along the airflow path for selectively heating and cooling air in the airflow path via a thermal fluid having an operating temperature at least partially determined by user input. The heat exchanger is the only heat exchanger of the HVAC apparatus. A passage is between the inlet and the outlet and dividing the airflow path into a first path through the heat exchanger and a second path through the passage bypassing the heat exchanger.

Embodiments of the second aspect of the present disclosure can include any one or a combination of the following features:

- a bypass door selectively covering the passage to control airflow through the first and second paths, and an actuator configured to move the bypass door in response to a control signal;
- a restriction plate extending across the passage and configured to reduce airflow through the second path;
- the restriction plate includes a baffle; and
- a temperature sensor configured to sense a temperature of air in the outlet.

According to a third aspect of the present disclosure, a heating, ventilation, and air conditioning (HVAC) apparatus for a vehicle includes a housing defining an inlet, a first outlet, a second outlet, an airflow path between the inlet and each of the first and second outlets, a heat exchanger disposed along the airflow path for selectively heating and cooling air in the airflow path, a first passage between the inlet and the first outlet and dividing the airflow path into a first path through the heat exchanger and a second path through the first passage bypassing the heat exchanger, a first bypass door selectively covering the passage to control airflow through the first and second paths, a second passage between the inlet and the second outlet and dividing the airflow path into a third path through the second passage bypassing the heat exchanger, and a second bypass door selectively covering the second passage to control airflow through the third path.

Embodiments of the third aspect of the present disclosure can include any one or a combination of the following features:

- the controller is configured to receive a target temperature set by a user and control a degree of opening for at least one of the first bypass door and the second bypass door in response to the target temperature.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
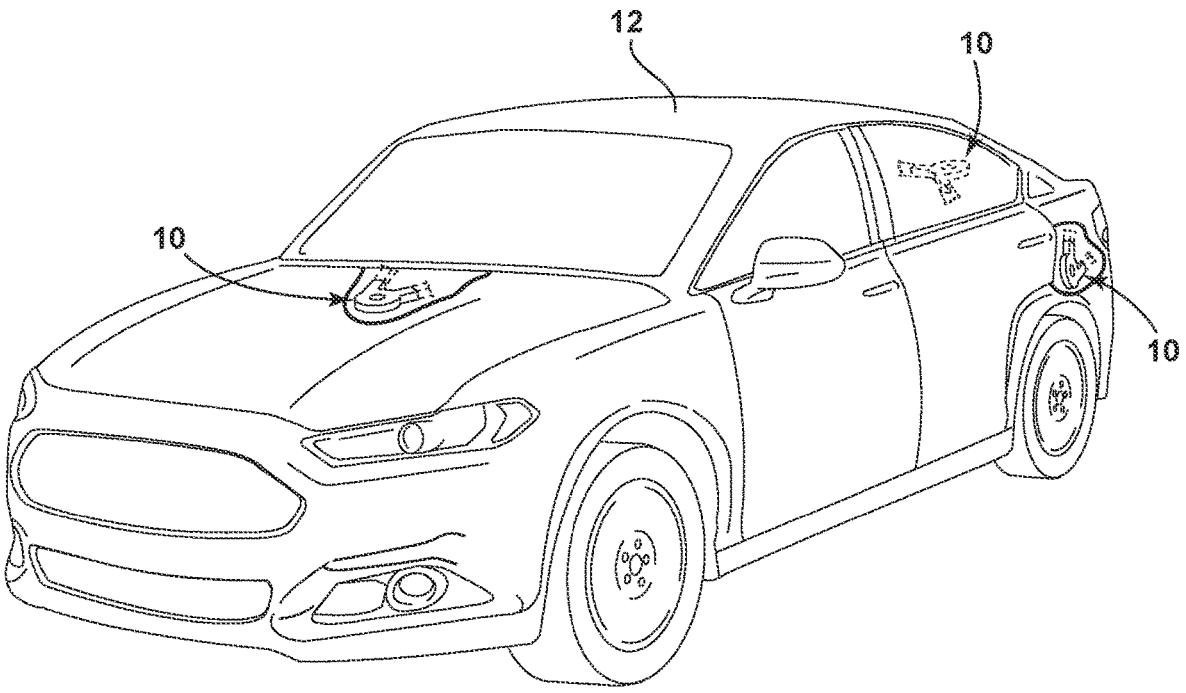
FIG. 1 is a perspective of a vehicle incorporating an HVAC apparatus according to one aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not too scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to climate control for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 2:
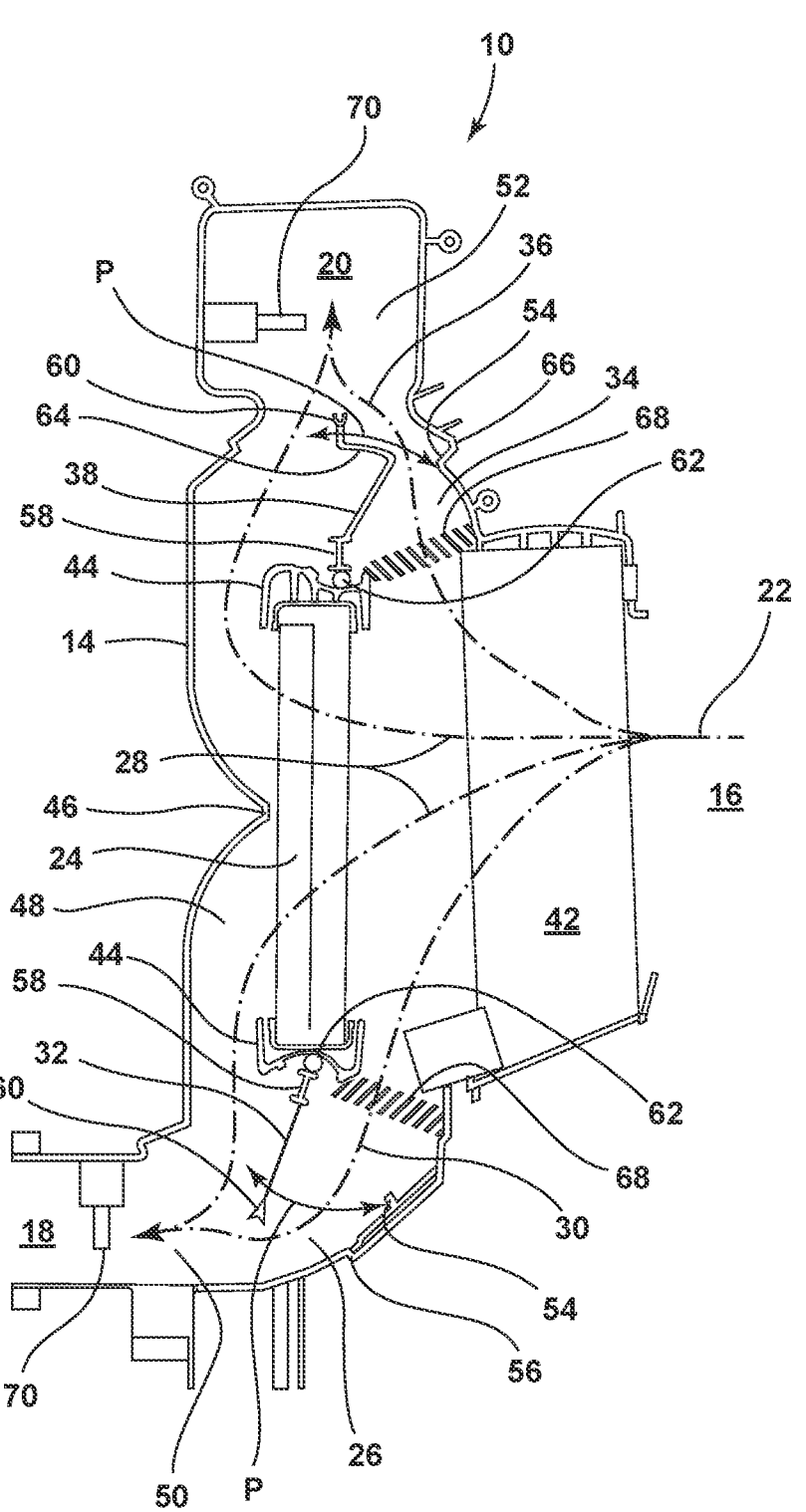
FIG. 2 is a cross-sectional view of a blower assembly of an HVAC apparatus for a vehicle.
Figure 3:
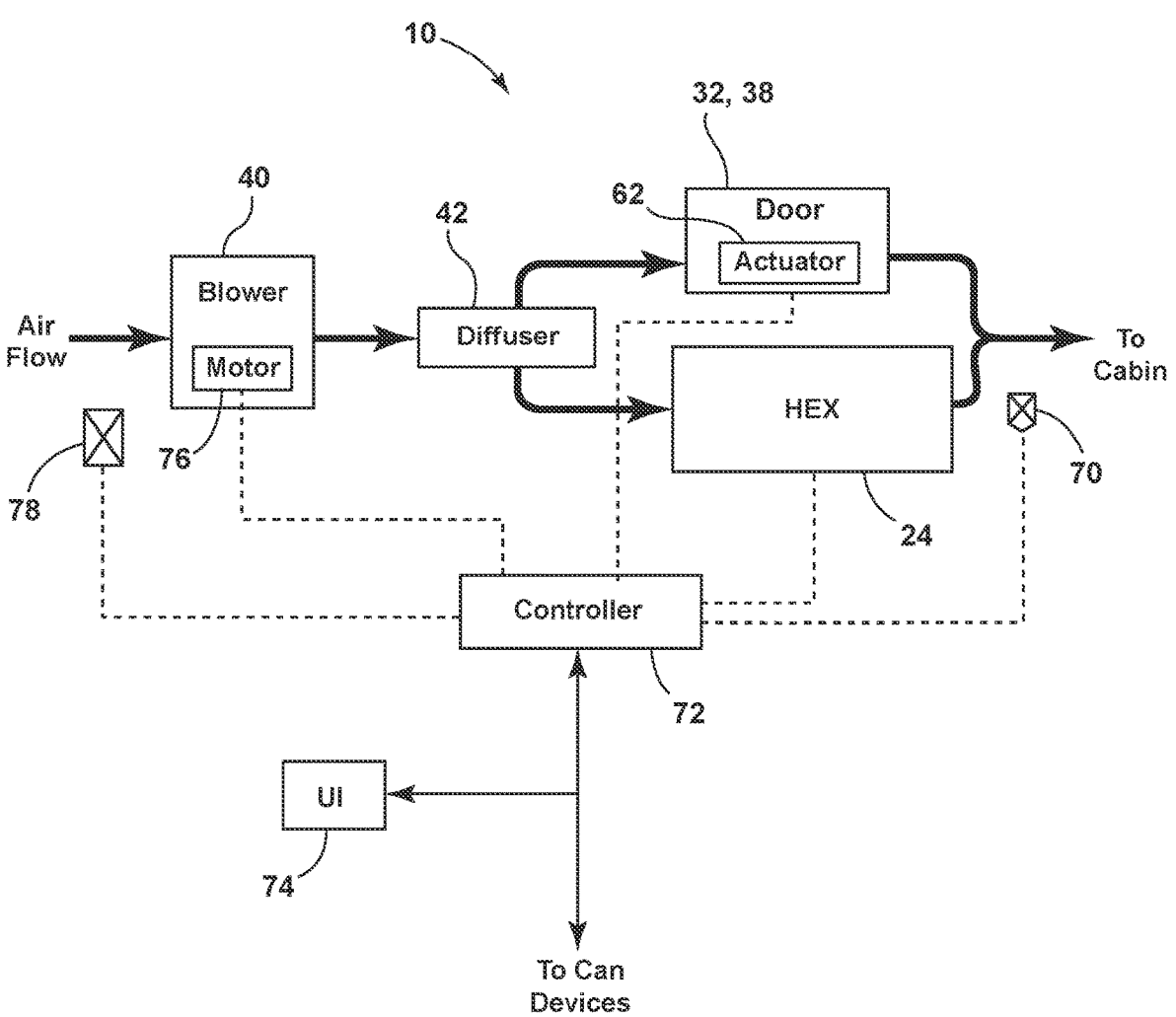
FIG. 3 is a functional block diagram of an HVAC apparatus for a vehicle.

Referring generally to FIGS. 1-3, a heating, ventilation, and cooling (HVAC) apparatus of a climate control system is generally designated at 10. In general, the HVAC apparatus 10 can be configured to heat or cool a local area of a vehicle 12, such that multiple HVAC apparatuses 10 can be distributed in the vehicle 12 to provide localized climate control. The HVAC apparatus 10 can provide for enhanced control by monitoring temperature and controlling airflow through and around heating components of the HVAC apparatus 10. The HVAC apparatus 10 can also operate with enhanced efficiency by providing a single-core thermal fluid system. The HVAC apparatus 10 can further provide for reduced complexity by omitting a coolant valve for mixing multiple coolants for operational temperatures. Thus, the single-core thermal fluid and bypass features of the HVAC apparatus 10 can provide for enhanced climate control operation, reduced weight, and enhanced efficiency.

With continued reference to FIGS. 1-3, the HVAC apparatus 10 includes a housing 14 defining an inlet 16, a first outlet 18, a second outlet 20, and an airflow path 22 between the inlet 16 and each of the first and second outlets 18, 20. A heat exchanger 24 is disposed along the airflow path 22 for selectively heating and cooling air in the airflow path 22. A first passage 26 is between the inlet 16 and the first outlet 18 and divides the airflow path 22 into a first path 28 through the heat exchanger 24 and a second path 30 through the first passage 26 bypassing the heat exchanger 24. A first bypass door 32 selectively covers the passage to control airflow through the first and second paths 28, 30. A second passage 34 is between the inlet 16 and the second outlet 20 and divides the airflow path 22 into a third path 36 through the second passage 34 bypassing the heat exchanger 24. A second bypass door 38 selectively covers the second passage 34 to control airflow through the third path 36.

It is contemplated that the inlet 16 described herein can refer to a fluid opening between the pressurizing fan (e.g., a blower 40) upstream of the heat exchanger 24. Accordingly, the mechanism that pressurizes the air and the heat exchanger can be in a common housing, such as the housing 14. The housing 14 can therefore define a separate air intake, and the inlet 16 is the fluid connection between an air exit of the blower in one part of the housing 14 and another part of the housing 14 in which the heat exchanger 24 is disposed.

The HVAC apparatus 10 can provide cooled air to a zone of the vehicle 12. In some examples, a temperature of the thermal fluid of the heat exchanger 24 can be controlled to provide heated or cooled air. The HVAC apparatus 10 can include a blower 40 (FIG. 3) that can include fans or the like for drawing air into the housing 14. The heat exchanger 24 can then cool the air to produce climate-controlled air. The temperature of the air can be controlled via control of the temperature of the thermal fluid and/or air flow rate (e.g., speed of the blower 40). For example, the temperature of the thermal fluid can be controlled by the HVAC apparatus 10 to heat or cool the air flowing through the heat exchanger. As will be further described herein, the bypass system can be employed to provide finer-tuned control over multiple zones using a single heat exchanger 24 in the housing 14 and multiple bypass paths.

Referring now to FIG. 1, the vehicle 12 can incorporate a plurality of HVAC apparatuses 10, with each of the plurality of HVAC apparatuses 10 corresponding to a particular location of the vehicle 12. For example, each HVAC apparatus 10 can be configured to heat/cool one or more parts of a cabin of the vehicle 12. In the present examples, the HVAC apparatus 10 is configured to heat/cool two zones in the vehicle 12 by incorporating two of the bypass systems previously described. In this way, the HVAC apparatus can control individual temperatures of two zones using a single HVAC apparatus and, more particularly, a single heat exchanger 24.

It is contemplated that the locations of the HVAC apparatuses 10 shown in FIG. 1 are exemplary and nonlimiting. For example, a single HVAC apparatus 10 could be provided in a central area of the vehicle 12 for controlling the temperature of each part of the vehicle 12 using a bypass system for each zone of the vehicle 12 controlled by the HVAC apparatus 10.

Referring now to FIG. 2, inner workings of the HVAC apparatus 10 are demonstrated downstream of the blower 40 of the HVAC apparatus 10 (FIG. 3). The blower 40 can include a fan, driven by electromechanical components, that draws air and pressurizes the air within the housing 14 of the HVAC apparatus. As demonstrated in FIG. 1, the housing 14 can include an arcuate or generally circular shape, though the housing can be any shape. The blower 40 can be centrally located in the housing 14 and be configured to draw air into the housing 14 to flow centrifugally around the blower 40 and into the inlet 16 shown in FIG. 2. Thus, the inlet 16 shown in FIG. 2 may be downstream of an opening for air that enters the housing 14 from the cabin or passenger compartment.

The housing 14 includes a diffuser 42 that can be downstream of the blower 40 and configured to distribute toward the heat exchanger 24. The diffuser 42 can thus have a first width and the inlet 16 and a second width adjacent to the heat exchanger 24 that is greater than the first width. This can allow the pressurized air to disperse or distribute at the heat exchanger 24. The housing 14 further includes one or more outlets 18, 20 downstream of the diffuser 42 and configured to provide climate-controlled air to one or more zones of the vehicle 12. Accordingly, the HVAC apparatus 10 can provide different climates to different parts of the vehicle 12 using a common heat exchanger by controlling a plurality of the bypass doors 32, 38.

With continued reference to FIG. 2, the heat exchanger 24 can be mounted in the housing 14 via one or more clasps 44 projecting from the housing 14 and sandwiching the heat exchanger 24. For example, the heat exchanger 24 can be a single-core heat exchanger 24 that utilizes a single thermal fluid that flows through coils or a grid of the heat exchanger 24. The heat exchanger 24 can be the only heat exchanger 24 of the HVAC apparatus 10, such that the thermal fluid can be temperature-controlled to thereby control heating and cooling of the air through the heat exchanger 24. The thermal fluid can be coolant or refrigerant including at least one of freon, glycol, carbon dioxide, hydrogen, chlorine, fluorine, or another thermal fluid. The temperature of the thermal fluid (e.g., operating temperature) can be controlled by a heat pump system or other heat control system, such as a compressor and an expansion device that can control thermal capacity of the thermal fluid. In the present example, the heat exchanger 24 does not include a coolant valve, but rather utilizes a common thermal fluid and controls the temperature of the common thermal fluid in the heat exchanger 24.

The housing 14 can include a divider 46, or dividing portion, downstream of the heat exchanger 24 that can limit air from mixing downstream of the heat exchanger 24. For example, the divider 46 can be a plate or other extension that extends from the housing 14 toward the heat exchanger to divide the airflow path 22 further between the multiple outlets 18,20. For example, the divider 46 can include one or more dividing portions that define one or more dividing planes generally orthogonal to the heat exchanger 24. In other examples, a central point or fin interacts with or is disposed proximate to the heat exchanger 24 to divide the outlets 18, 20 and form the separate second and third paths 30, 36. A room 48 downstream of the heat exchanger 24 can be divided into a first space 50 and a second space 52 that can have different climates (e.g., temperatures). By way of example, air flowing across the heat exchanger 24 may be heated or cooled to a common temperature, the amount of air at an ambient temperature of the vehicle 12 or outside of the vehicle 12 (if air is drawn from external air) that is mixed with the heated/cooled air can vary depending on the position of the individual bypass doors 32, 38. The number of spaces may be more or less than 2 depending on the number of outlets 18, 20.

By way of example, a degree of opening of the first bypass door 32 can differ from a degree of opening of the second bypass door 38 during operation. The first bypass door 32 can exceed the degree of opening the second bypass door 38, resulting in more air at a first temperature (e.g., an ambient temperature) flowing through the first bypass door 32 than the second bypass door 38. In this example, if the heat exchanger 24 is being controlled to provide cold thermal fluid to cause air flowing across the heat exchanger 24 to be colder than air through the first passage 26 and the second passage 34, the climate-controlled air through the first outlet 18 can be warmer than the climate-controlled air through the second outlet 20.

Still referring to FIG. 2, each of the bypass doors 32, 38 can be configured to interact with a lip 54 extending from the housing 14 when the bypass door is closed. While demonstrated as pivotally connected to the clasps 44 holding the heat exchanger 24, the bypass doors 32, 38 can alternatively be connected to an outer wall 56 of the housing 14 and extend toward the lips 54, which can be connected to the clasps 44. In the present example, each bypass door extends from a proximal end 58 to a distal end 60 that can move along the motion profiles P. When the bypass doors 32, 38 are completely closed, the distal ends 60 can engage the lips 54 to block airflow through the passages 26, 34. In the closed positions, all air from the inlet 16 passes through the heat exchanger 24. An actuator 62 (e.g., an electromechanical actuator 62) can be positioned at the proximate end of each bypass door for controlling the degree of opening of each bypass door. By controlling the degree of opening of the bypass doors 32, 38, the mixture of ambient air and heated/cooled air at the outlets 18, 20 is also controlled.

The second bypass door 38 in the present example includes an elbow portion 64 that can allow the second bypass door 38 to interact with a protrusion 66 formed by the outer wall 56. The elbow portion 64 can additionally or alternatively be incorporated into the first bypass door 32 when the first bypass door 32 operates with a protrusion 66 in the first passage 26. In either example of the bypass doors 32, 38 (e.g., straight, or not straight), the degree of opening can control the temperature of the air leaving the given outlets 18, 20.

With continued reference to FIG. 2, a restriction plate 68 can be operably coupled with each bypass door for equalizing pressure between the inlet 16 and the outlets 18, 20 (e.g., between air that flows through the heat exchanger 24 and air that flows through the bypass paths). For example, each restriction plate 68 can include baffles or grating that the air passes through when the given bypass door is at least partially opened. The restriction plates 68 can be mounted between the housing 14 and the clasps 44 and be generally independent from the corresponding bypass door. At least one downstream temperature sensor 70 can be disposed in the housing 14 at least of the outlets 18, 20 for measuring downstream air temperature. While not demonstrated in detail, a second temperature sensor can be located proximate to or engaging the heat exchanger 24 for measuring a temperature of the heat exchanger 24. For example, the second temperature sensor can detect a temperature of a body of the heat exchanger or a temperature of the thermal fluid. The temperature of the heat exchanger and the downstream air can be used by the HVAC apparatus 10 to control a level of opening of the doors 32, 38 and/or to control a temperature of the thermal fluid.

Referring now to FIG. 3, the HVAC apparatus can include control circuitry that is configured to monitor and control various aspects related to climate control using the HVAC apparatus 10. The control circuitry can include one or more controllers 72, such as a local controller 72 or a controller remote from the HVAC apparatus 10, that includes a processor and memory. The memory stores instructions that, when executed by the controller 72, cause the controller 72 to read from/write to inputs and outputs, respectively, to enhance climate control for the vehicle 12. The controller 72 can be on a controller-area network (CAN) bus that provides communication to one or more remote control devices. For example, if the HVAC apparatus 10 controls one of many zones of the cabin, a remote control device can communicate instructions to the controller 72 of each HVAC apparatus 10 to control the climates of the vehicle 12. A user interface 74 can also be provided on the CAN bus to allow a user to control the temperature for a given zone. While the user interface 74 is shown as a communication device, it is contemplated that the user interface 74 could be any control knob, button, or manual switch that can control a climate of the given zone of the vehicle 12. Thus, the user interface 74 can be any interface that allows temperature to be set by a user.

In response to the target temperature set by the user, controller 72 can control one or more components of the HVAC apparatus 10 via one or more signals. For example, the controller 72 can be in communication with the blower 40 (via control of a motor 76), the bypass doors 32, 38 (via the actuators 62), the heat exchanger 24 (and components thereof), the downstream temperature sensors 70, and upstream temperature sensors 78 (e.g., ambient temperature sensors). In operation, the controller 72 receives the target temperature from the user and compares the target temperature to the temperature in the designated zone(s) of the vehicle 12. In response to the comparison (e.g., differences in the target temperature and the ambient temperatures), the controller 72 controls the actuators 62, the heat exchanger 24, and the blower 40. While these output components are being adjusted, the controller 72 monitors the downstream temperature sensors 70 and continues comparing the target temperature to the downstream temperatures. The controller 72 takes corrective action, if needed. For example, the controller 72 can completely close off the first bypass door 32 and increase or decrease the temperature of the thermal fluid to adjust the temperature of a first zone controlled by the first outlet 18 at a rate greater than an adjustment to a second zone controlled by the second outlet 20.

In some examples, the controller 72 can determine a target operating temperature of the thermal fluid by comparing two target temperatures (one for a first zone, and one for a second zone) to one another to determine a temperature range. By way of example, a first passenger can select a first target temperature for a first zone, and a second passenger can select a second temperature for a second zone, with the temperature of each zone being controlled by a single HVAC apparatus 10. Based on a difference between the target temperatures (e.g., a differential), and ambient temperature, the controller 72 can select the operating temperature for the thermal fluid that can support both temperatures. Continuing with the example, the controller 72 can control the positions of the bypass doors 32, 38 via activation signals to the actuators 62. The actuators 62 can include a valve, a motor 76, or another electromechanical device that can rotate or otherwise mote the bypass doors 32, 38. The controller 72 can also read the position of the bypass doors 32, 38 using sensors (e.g., a Hall effect sensor, a potentiometer, an encoder) to confirm movement of the bypass doors 32, 38, and/or the actuators 62.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or end-point referred to. Whether or not a numerical value or endpoint of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It is to be understood that variations and modifications can be made on the aforementioned structure without departing from the concepts of the present disclosure, and further, it is to be understood that such concepts are intended to be covered by the following claims unless these claims by their language expressly state otherwise.

What is claimed is:

1. A heating, ventilation, and air conditioning (HVAC) apparatus for a vehicle, comprising:

a housing defining an inlet, an outlet, and an airflow path between the inlet and the outlet;

a heat exchanger disposed along the airflow path for selectively heating and cooling air in the airflow path, wherein the heat exchanger is the only heat exchanger of the HVAC apparatus, and wherein the heat exchanger contains thermal fluid having an operating temperature at least partially determined by user input;

a passage between the inlet and the outlet and dividing the airflow path into a first path through the heat exchanger and a second path through the passage bypassing the heat exchanger;

a bypass door selectively covering the passage to control airflow through the first and second paths;

a first temperature sensor configured to sense a temperature of air in the outlet; and a restriction plate extending across the passage and configured to reduce airflow through the second path.

2. The HVAC apparatus of claim 1, wherein the restriction plate includes a baffle.

3. The HVAC apparatus of claim 1, wherein the housing defines a second outlet, and further comprising:

a second passage between the inlet and the second outlet and dividing the airflow path into a third path through the second passage bypassing the heat exchanger; and a second bypass door selectively covering the second passage to control airflow through the third path.

4. The HVAC apparatus of claim 1, further comprising:

a divider downstream of the heat exchanger and dividing the first path into a plurality of outlet paths each extending to a corresponding plurality of outlets.

5. A heating, ventilation, and air conditioning (HVAC) apparatus for a vehicle, comprising:

a housing defining an inlet, an outlet, and an airflow path between the inlet and the outlet;

a heat exchanger disposed along the airflow path for selectively heating and cooling air in the airflow path via a thermal fluid having an operating temperature at least partially determined by user input, wherein the heat exchanger is the only heat exchanger of the HVAC apparatus;

a passage between the inlet and the outlet and dividing the airflow path into a first path through the heat exchanger and a second path through the passage bypassing the heat exchanger;

a bypass door selectively covering the passage to control airflow through the first and second paths;

an actuator configured to move the bypass door in response to a control signal; and a restriction plate extending across the passage and configured to reduce airflow through the second path.

6. The HVAC apparatus of claim 5, wherein the restriction plate includes a baffle.

7. The HVAC apparatus of claim 5, further comprising:

a temperature sensor configured to sense a temperature of air in the outlet.

8. A heating, ventilation, and air conditioning (HVAC) apparatus for a vehicle, comprising:

a housing defining an inlet, a first outlet, a second outlet, and an airflow path between the inlet and each of the first and second outlets;

a heat exchanger disposed along the airflow path for selectively heating and cooling air in the airflow path;

a first passage between the inlet and the first outlet and dividing the airflow path into a first path through the heat exchanger and a second path through the first passage bypassing the heat exchanger;

a first bypass door selectively covering the passage to control airflow through the first and second paths;

a second passage between the inlet and the second outlet and dividing the airflow path into a third path through the second passage bypassing the heat exchanger; and a second bypass door selectively covering the second passage to control airflow through the third path.

9. The HVAC apparatus of claim 8, wherein the controller is configured to receive a target temperature set by a user and control a degree of opening for at least one of the first bypass door and the second bypass door in response to the target temperature.

* * * * *